United States Patent
Stallworth et al.

[11] 3,898,878
[45] Aug. 12, 1975

[54] SHIP SPEED INDICATOR

[75] Inventors: Lewis A. Stallworth, East Lyme; Robert R. Hartley, Niantic, both of Conn.

[73] Assignee: The United States of America as represented by the Secretary of the Navy, Washington, D.C.

[22] Filed: Aug. 15, 1974

[21] Appl. No.: 497,607

[52] U.S. Cl. ............................ 73/181; 73/194 A
[51] Int. Cl.² ................................ G01C 21/10
[58] Field of Search ........... 73/181, 194 A; 340/5 S, 340/8 D

[56] References Cited
UNITED STATES PATENTS

| | | | |
|---|---|---|---|
| 3,209,591 | 10/1965 | Lester et al. | 73/181 |
| 3,402,606 | 9/1968 | Bruha | 73/194 A |
| 3,729,993 | 5/1973 | Eck et al. | 73/181 |

Primary Examiner—Donald O. Woodiel
Attorney, Agent, or Firm—Richard Sciascia; Arthur A. McGill; Prithvi C. Lall

[57] ABSTRACT

A device for measuring the speed of a ship in a medium which includes two acoustic projector-receiver units mounted at two points on the bottom of the ship and a logic module conveniently located inside the ship and connected to the two units. The two selected points are located away from the hull of the ship to avoid any turbulence due to the motion of the ship and the line joining the two points is in the direction of the motion of the ship. From the electronic measurements of the times taken by the acoustic signals to travel from the projector of one unit to the receiver of the other unit using electrical and acoustic signals simultaneously and the distance between the two points, the speed of the ship is computed.

3 Claims, 5 Drawing Figures

PATENTED AUG 12 1975 3,898,878

SHEET 1

SHIP SPEED INDICATOR

STATEMENT OF GOVERNMENT INTEREST

The invention described herein may be manufactured and used by or for the Government of the United State of America for governmental purposes without the payment of any royalties thereon or therefor.

BACKGROUND OF THE INVENTION

This device is related to measuring the speed of the ship in a medium and more particularly to a ship speed indicator for measuring the speed of a moving ship in a body of water.

The standard methods used for measuring the speed of the ship are the electromagnetic log (EM Log) method and pitometer log (Pit Log) method. The EM Log method measures variations in the electric field across the electrodes among which a conducting fluid such as sea water moves. The Pit Log method measures pressure, through a standard orifice in a probe, created by the movement through the water. The sensors used for measuring electrical field and pressure are subject to variation and deterioration due to corrosion and marine growth. As a result of this, even with frequent recalibration, errors of the order of one or two knots are not uncommon in these methods. Even the EM Log method which is the more accurate method of the two, the results under ideal conditions have an error of about 0.25 knots. Thus there is a need for a method which is much more accurate than either of the two above-mentioned methods and which is insensitive to moderate corrosion and marine growth.

SUMMARY OF THE INVENTION

The objects and advantages of the present invention are accomplished by utilizing a device which comprises two acoustic projector-receiver modules, each of which is mounted at a preselected point on the external bottom surface of the ship and a logic and display module located within the interior of the ship. The points called the Aft point and the Forward point, where acoustic projector-receiver modules are located are in line with the line of direction of the motion of the ship and have an unobstructed acoustic path between them. From the measurements of the time taken by acoustic signals to travel from the projector of one of the modules to the receiver of the second module and vice versa, using acoustic and electrical signals simultaneously and from the distance between the two selected points, one is able to compute the speed of the ship using the formula:

$$V = \frac{0.972 S (T_1 - T_2)}{2 T_1 T_2}$$

where $V$ is the velocity of the ship in knots, $S$ is the distance in meters between the selected points, and $T_1$ and $T_2$ are the times in seconds taken by the acoustic signals to travel from the Aft point to the Forward point and the Forward point to the Aft point, respectively.

One object of this invention is to provide a device for measuring the speed of a ship accurately.

Another object of this invention is to provide a ship speed indicator which is not affected by marine growth or corrosion effects in sea water.

Still another object of this invention is to measure the time for acoustic signals to travel from one point to the other more accurately using acoustic and electrical signals simultaneously.

Other objects, advantages and novel features of the invention will become apparent from the following detailed description of the invention when considered in conjunction with the accompanying drawings wherein:

DESCRIPTION OF A PREFERRED EMBODIMENT

Figure 1:
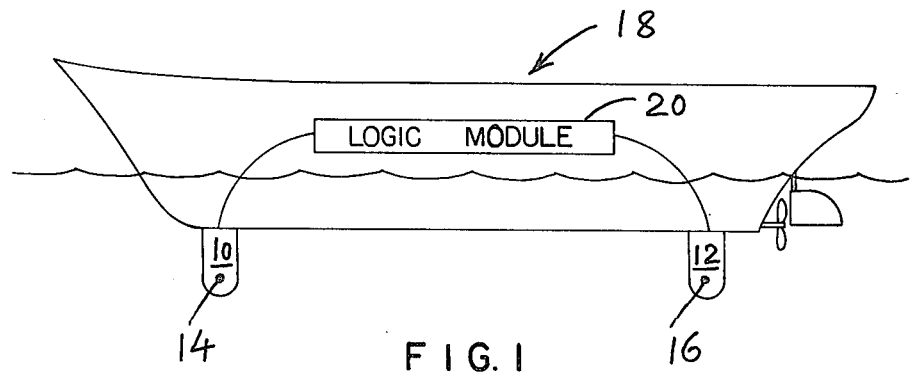
FIG. 1 shows schematically the position of the two acoustic projector-receiver modules and the logic module in relation to the ship.

Referring to the drawings wherein like reference characters designate identical or corresponding parts in various figures, and more particularly to the first figure thereof, FIG. 1 schematically shows the location of acoustic projector-receiver modules 10 and 12 located at Aft point 14 and Forward point 16 respectively on the bottom surface of ship 18. As shown in FIG. 1, logic module 20 is located inside the ship and is in communication with modules 10 and 12. If S is the distance between points 14 and 16 of FIG. 1, C the speed of sound which is assumed to be constant over distance S, and $T_1$ is the time taken by acoustic signals to go from point 14 to point 16, $T_2$ is the time for acoustic signal to travel from point 16 to point 14, V the speed of the ship through the water, using the fact that distance travelled by a moving object is given by the speed of the moving object multiplied by the time taken to cover that distance, one gets the following relationships:

$$S = (C + V) T_2 \qquad (1)$$

and $$S = (C - V) T_1 \qquad (2)$$

From (1) $C = \dfrac{S}{T_2} - V$ \qquad (3)

From (2) $V = C - \dfrac{S}{T_1} = \dfrac{S}{T_2} - V - \dfrac{S}{T_1}$ \qquad (4)

$$V = \frac{S}{2} \left[ \frac{1}{T_2} - \frac{1}{T_1} \right]$$

$$V = \frac{S}{2} \left[ \frac{T_1 - T_2}{T_1 T_2} \right]$$

where $S$ is measured in meters, $T_1$ and $T_2$ in seconds and $V$ in meters per sec.

If $V$ is expressed in knots, using the fact that 1 meter per second is equal to 1.944 knots, the speed of the ship in knots is given by the relationship:

$$V(\text{knots}) = 0.972 S \left[ \frac{T_1 - T_2}{T_1 T_2} \right] \qquad (5)$$

where S is measured in meters, $T_1$ and $T_2$ in seconds.

Figure 2:
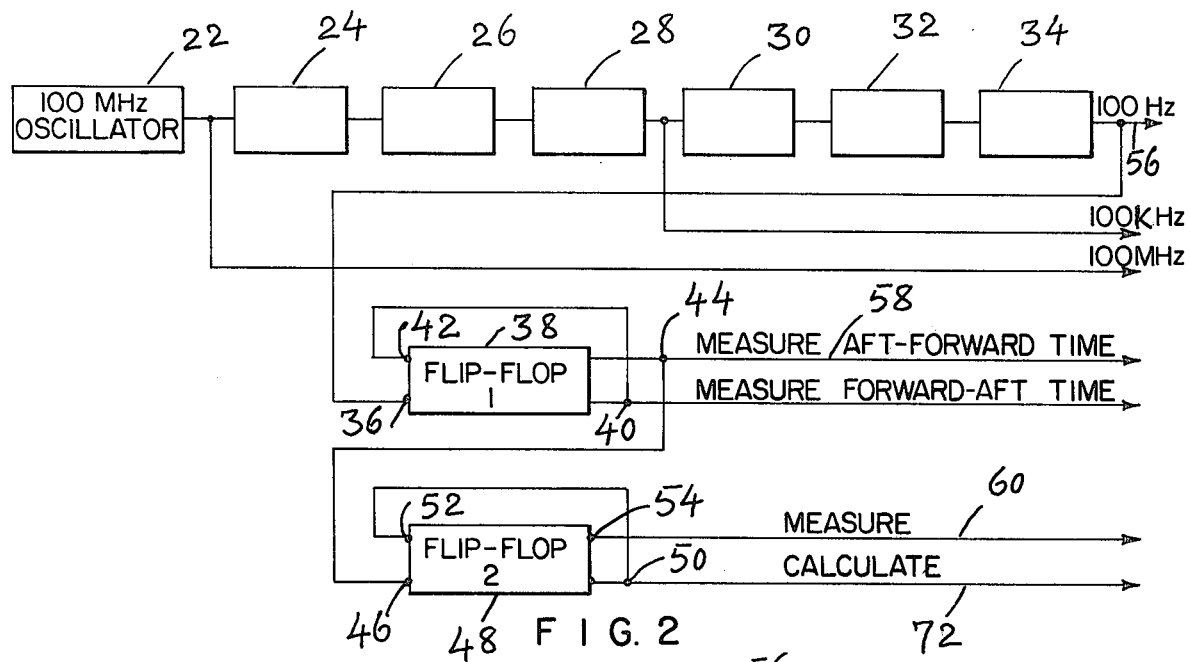
FIG. 2 schematically shows various electrical signals generated using a single pulse source.

Thus the system described below measures the speed of the ship accurately by measuring the time difference between acoustic signals travelling in the direction of the motion of the ship and the acoustic singals or waves travelling in the opposite direction to cover a preselected distance. This system has the potential of measuring the difference between the time duration within the accuracy of a few nanoseconds (1 nanosecond = 1 × 10$^{-9}$ second), thus providing ship speed accurately up to a few hundredths of a knot. When the system is energized, it operates in a continuous mode without any manual intervention. All timing pulses are developed from a single electrical pulse source 22, which preferably has a frequency of 100 megahertz, hereinafter called MHz, and decade registers 24, 26, 28, 30, 32, and 34, as shown in FIG. 2. Each of the decade registers divides the input by a factor of 10, thus outputs of pulse source 22, decade register 28, and decade register 34, provide electrical pulses of frequency 100 MHz, 100 kilohertz (kHz) and 100 hertz (Hz) respectively as shown in FIG. 2. 100 Hz signal is applied to terminal 36, the clock terminal, of circuit 38, flip-flop 1. Terminals 40 and 42 of circuit 38 are connected together and terminal 44 is set to have opposite polarity to that of terminal 40 or 42. Terminal 44 of circuit 38 is connected to terminal 46, the clock terminal of circuit 48, flip-flop 2. Terminal 50 of circuit 48 is connected to terminal 52 thereof. Terminal 54 of circuit 48 has always opposite plurality to that of terminal 50. Circuits 38 and 48 are D-type Edge Triggered Flip-Flops and terminals 42 and 52 change states from their low states or "logic zero" states to high states or "logic one" states when a pulses with a positive edge is applied to terminals 36 and 46 respectively. Output at terminal 44 of circuit 38 is used to measure AFT-FORWARD time, $T_1$; and output at terminal 40 of circuit 38 is used to measure FORWARD-AFT time, $T_2$. Outputs at terminals 54 and 50 are opposite to each other. They are used to measure $T_1$ and $T_2$ and to calculate, ship velocity, respectively as shown in FIG. 2.

Figure 3:
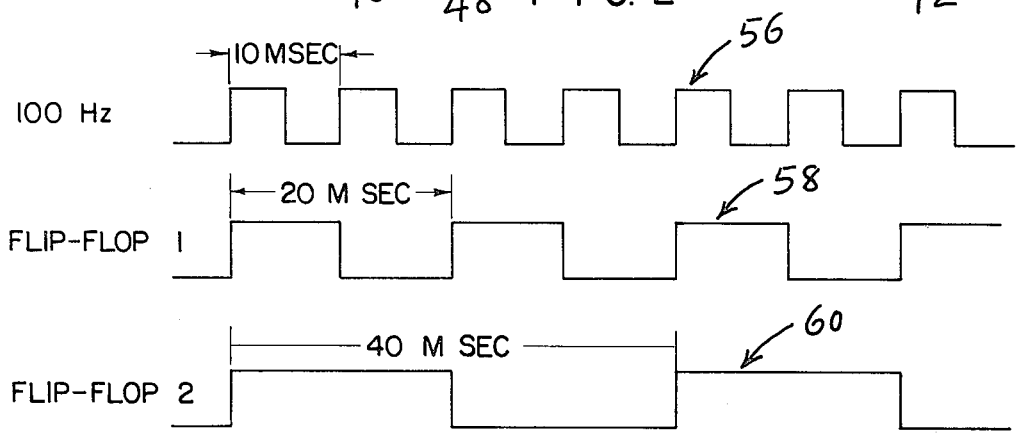
FIG. 3 illustrates the time relationship between the electrical pulses generated from a single pulse source of FIG. 2.

The operating cycle of the device consists of three distinct time periods. The first 10 milliseconds, hereinafter called msec, period is used to measure the tme required for an acoustic pulse or signal to travel from the Aft projector to Forward receiver. The second 10 msec period is used to measure the time required for an acoustic pulse or signal to travel from the Forward projector to the Aft receiver. The third period is 20 msec long which is used to calculate the velocity in knots from the two time measurements in the preceding time periods of 10 msec each. The operating cycle is developed from 100 Hz square wave, output 56 of decade register 34, as follows:

Assuming that all decade registers or counters and flip-flops are in the reset state, i.e., registers at zero and the flip-flops 1 and 2 with outputs at terminals 44 and 54 respectively at logic zero state. The 100 Hz square wave pulse, i.e., output 56 is wired directly to terminal 36 of circuit 38 which is wired as a clocked toggle switch (output at terminal 40 conected to input at terminal 42). Circuit 38, flip-flop 1, will change state each time the positive edge of the 100 Hz square wave pulse appears at the clock input, terminal 36 of circuit 38. A timing diagram of the operating cycle is shown in FIG. 3. The output 58 at terminal 44 of circuit 38 is thus a 50 Hz square wave pulse which is connected directly to the clock input, terminal 46, of circuit 48, flip-flop 2, which is wired as a clocked toggle switch. Circuit 48 will change state each time circuit 38 changes state twice. Thus the output 60 at terminal 54 of circuit 48 will be a 25 Hz square wave pulse as shown in FIG. 3.

Assuming that all flip-flops and counters or registers are in the reset condition described as above, the first positive edge of 100 Hz square wave will set circuit 38, i.e., flip-flop 1. The output at terminal 44 of circuit 38 will then go to a logic one condition. The leading edge of the logic one output of circuit 38 or flip-flop 1, will act as a clock pulse for circuit 48 or flip-flop 2, placing it in the set condition. This places a logic one condition on the output at terminal 54 of circuit 48 and a logic zero condition on the output at terminal 50. This is the condition required to set off the necessary gates for the measurement of the time duration of the acoustic wave travelling from the Aft projector to the Forward receiver.

Figure 4:
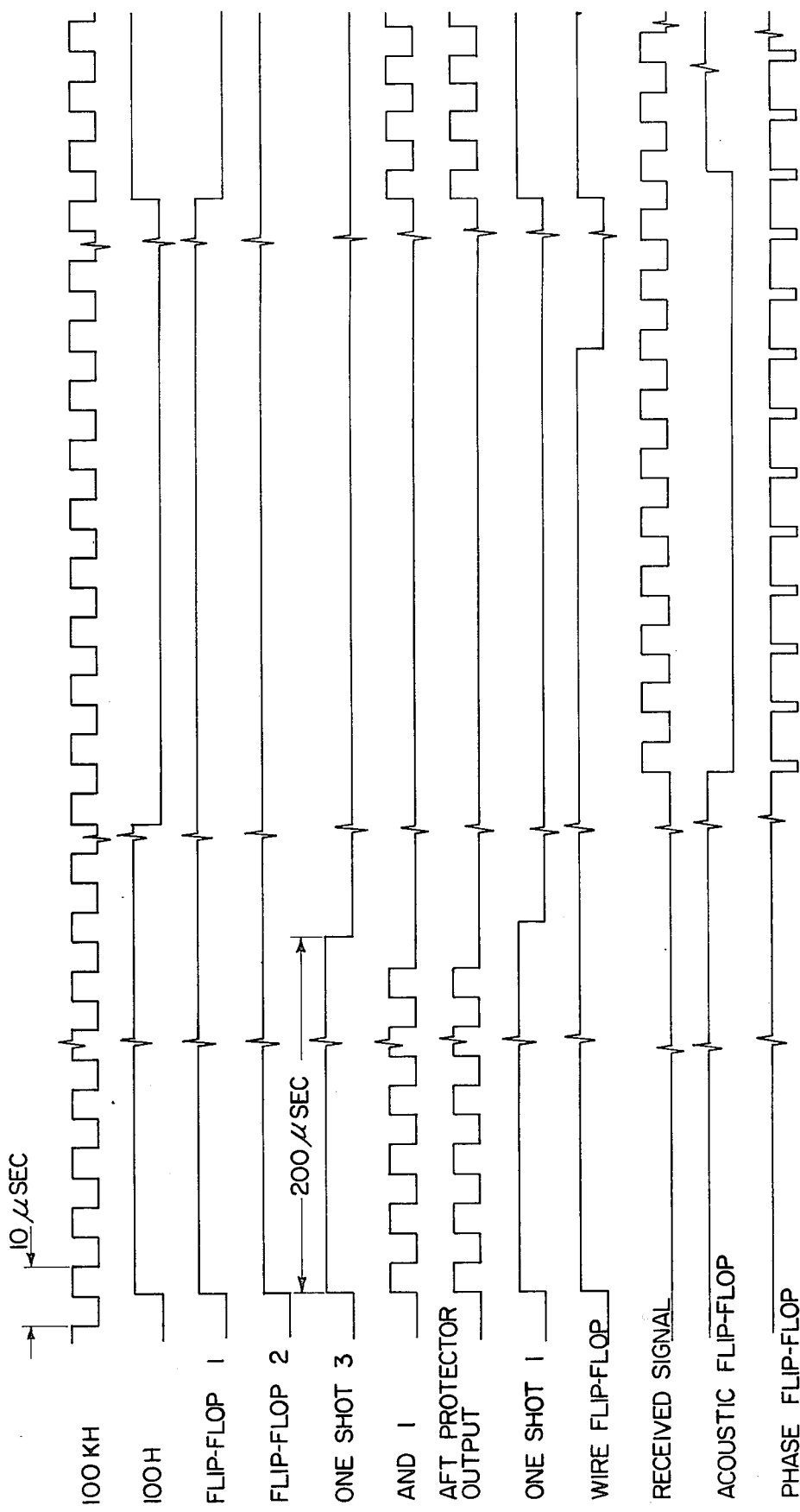
FIG. 4 illustrates a time delay correlation of various electrical signals in the ship speed indicator.
Figure 5:
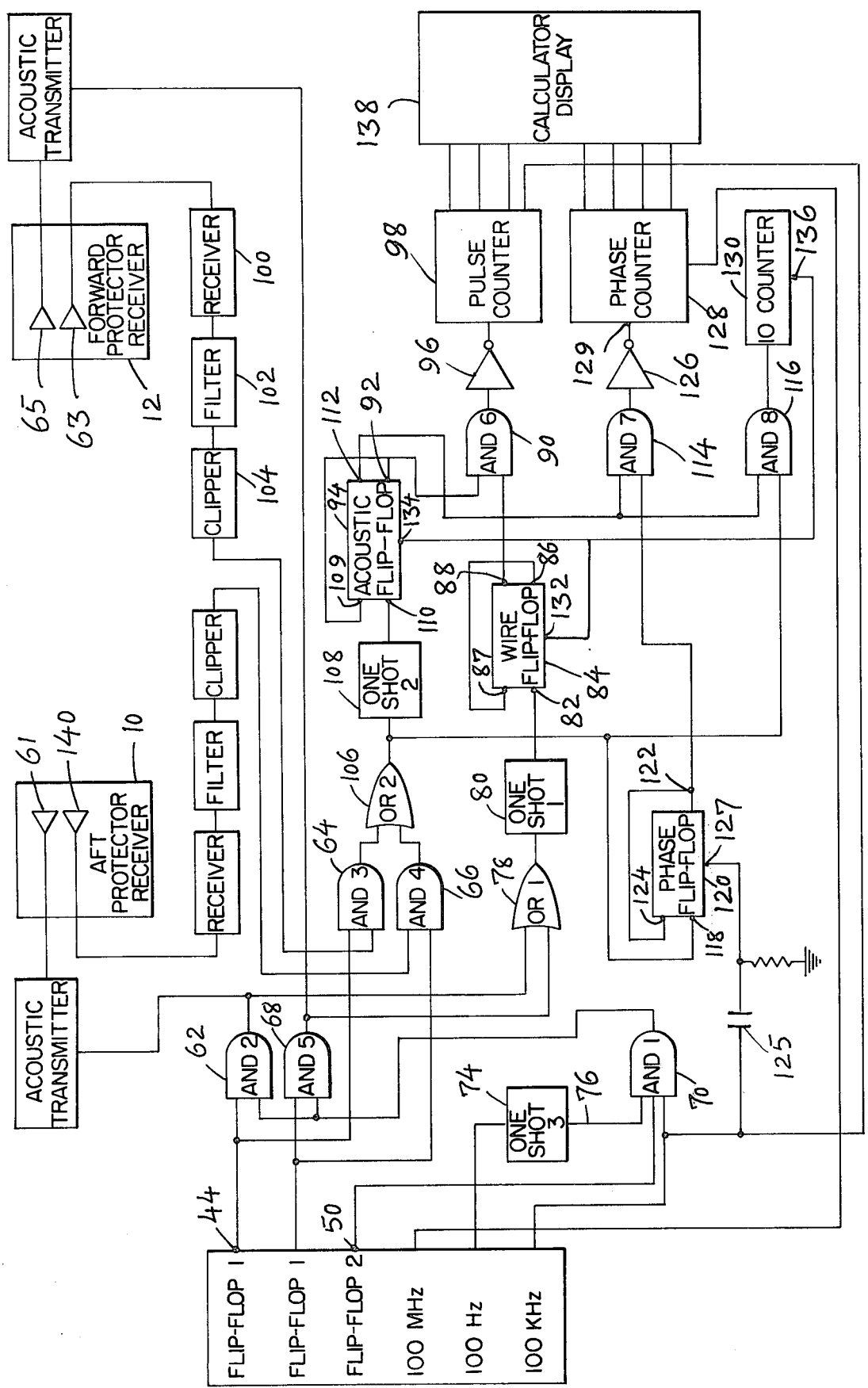
FIG. 5 is a block diagram of one of the acoustic projector-receiver modules of the ship speed indicator.

The measurement of time required for an acoustic pulse or signal to travel from the Aft projector to the Forward receiver is accomplished in the following manner:

Referring to the time diagram of FIG. 4 and the logic diagram shown in FIG. 5, the logic one signal from terminal 44 of circuit 38 is used to turn on the projector 61 of Aft module 10 and the receiver 63 of Forward module 12 by placing the logic one signal on one input of each of AND 2 circuit 62 and AND 3 circuit 64. AND 4 circuit 66 and AND 5 circuit 68 remain in the off condition. AND 1 circuit 70 is turned on during both measurement periods by the logic one signal from the output 72 of terminal 50 of circuit 48 i.e. flip-flop 2. AND 1 circuit 70 is used to produce the output pulse for both acoustic projectors, i.e., Aft projector 61 and the Forward projector 65. The positive edge of each of the 100 Hz square wave pulses trigger "One Shot 3" circuit 74, an edge-triggered monostable multivibrator, into the set state which produces a logic one signal on the output 76 of One Shot 3 circuit 74 for approximately 200 msec. Application of this logic signal to the second input of AND 1 circuit 70 allows approximately 20 of the 100 Hz square wave pulses to go through AND 1, circuit 70, AND 2 circuit 62 and AND 5 circuit 68. Since AND 2 circuit 62 had previously been opened by the logic one signal from the output 58 at terminal 44 of circuit 38 flip-flop 1, the pulsed signal will be projected into the water by projector 61 of Aft of module 10. Since AND 5 circuit 68 is held in the off condition by the logic zero signal at the output terminal 40 of flip-flop 1 or circuit 38, the projector 65 of Forward module 12 will remain inactive. The positive leading edge of the first pulse of 100 kHz square wave at the output of AND 2 circuit 62 also passes through OR 1 circuit 78 and triggers One Shot 1 circuit 80, a retriggerable monostable multivibrator, with a time constant long enough to hold the One Shot 1 circuit 80 in the logic one position between the 100 kHz pulses. The positive edge of the "logic one" signal on the output of One Shot 1 circuit 80 acts as a clock signal on the clock input 82 of the wire flip-flop 84, a D-type edge triggered flip-flop. Since the wired flip-flop circuit 84 was assumed to be in the reset condition originally, the output at terminal 86 will be in the logic one state. The logic one state at terminal 87 of the wire flip-flop 84 will cause the flip-flop to go into the set condition when it receives the leading edge of the One Shot 1, circuit 80, pulse.

The logic one signal on the output at terminal 88 of the "Wire Flip-flop" 84 will be gated through AND 6 circuit 90 since the other input to AND 6 circuit 90 is normally held at logic one by the output at 92 of the "Acoustic Flip-flop" circuit 94. The output of AND 6 circuit 90 is inverted by inverter 96 and used as the enable input for the "Pulse Counter" 98 (a three digit decade counter). With the counter 98 enabled, the 100 KHz pulses are counted as each positive edge of the pulse appears at the clock input of the counter.

The acoustic signal is received on receiver 63 of the Forward module 12 approximately 6,670 msec after it has been transmitted by the projector 61 of Aft module 10. The acoustic signal is converted to an electrical output by the hydrophone of the Forward module 12, amplified in the acoustic receiver 100, filtered through a "Bandpass Filter" 102, and clipped in a "clipper" 104 to form a 20 pulse chain of near square wave 100 KHz pulses out of phase with the 100 KHz reference signal. The received processed pulses go through AND 3 circuit 64 which is held in the open state by the logic one signal of the output at terminal 44 of Flip-flop 1 circuit 38. The received signal then passes through OR 2 circuit 106 where the positive edge of the first pulse triggers ONE SHOT 2 circuit 108 which is a retriggerable monostable multivibrator with a time constant long enough to hold ONE SHOT 2 circuit 108 in the logic one position between the 100 KHz pulses.

The positive edge of the logic one signal on the output of ONE SHOT 2 circuit 108 acts as a clock signal on the clock terminal 110 of the Acoustic Flip-flop 94, a D-Type Edge Triggered Flip-flop. Since the Acoustic Flip-flop 94 was previously assumed to be in the reset position, the logic one signal on terminal 109 of the flip-flop 94 will cause it to go into the set condition with the positive leading edge of the circuit 108 or ONE SHOT 2 pulse. When the Acoustic Flip-flop 94 goes into the set condition, its output at terminal 112 goes to logic zero which closes AND 6 circuit 90, disables and latches the Pulse Counter 98.

The count latched in the Pulses Counter 98 is the total number of 10 microsecond (usec) intervals between the time the acoustic pulses were transmitted from acoustic projector 61 and when these pulses were received on acoustic receiver 63. The time interval contained in the Pulse Counter 98 will be less than the total travel time by that fractional part of the 10 usec period between the leading edge of the received pulse and the leading edge of the reference 100 KHz square wave, i.e. the phase difference between the received square wave and the reference square wave.

The fractional part of the 10 usec period (phase difference) is obtained by averaging the time difference between the positive leading edge of 10 pulses from the received pulse train and 10 pulses from the reference square wave. This is accomplished in the following manner:

When the Acoustic Flip-flop 94 goes into the set state by the receipt of the leading edge of the first acoustic pulse, its output at terminal 112 goes to a logic one state. This logic one signal opens gate AND 7 circuit 114 and AND 8 circuit 116 so that signals on the other input of the gates are allowed to pass through.

The acoustic signal received on the Forward acoustic receiver goes through AND 3 circuit 64 and OR 2 circuit 106 to the clock input 118 of the Phase Flip-flop 120, a D-Type Edge Triggered Flip-flop, which is configured in a toggle arrangement, i.e., output terminal 122, wired to input terminal 124. The leading edge of each acoustic pulse triggers the flip-flop 120 into the set condition. A signal from the 100 KHz reference square wave is differentiated by capacitor 125 and goes to the reset input 127 of the Phase Flip-flop 120. This resets the flip-flop on each positive leading edge of the 100 KHz square wave signal. Output at terminal 122 of the Phase Flip-flop 120 is a series of logic one pulses whose width is equal to the delay between the acoustic pulses and the 100 KHz reference pulses. These pulses are passed through AND 7 circuit 114, inverted by inverter 126 and are used to enable Phase Counter 128, a 4 digit decade counter. The 100 MHz signal on the clock input 129 of the Phase Counter 128 are counted as long as the counter is enabled.

The acoustic pulses from the OR 2 circuit 106 are passed through AND 8 circuit 116 and used as the clock input of the "10 Counter" 130. The 10 Counter 130 counts 10 pulses, then places a logic one signal on the reset inputs 132, 134, and 136 on the Wire Flip-flop 84 and the Acoustic Flip-flop 94, and the 10 Counter 130 respectively. When the Acoustic Flip-flop 94 is reset, the output at terminal 112 goes to a logic zero state which cuts off AND 7 circuit 114 and AND 8 circuit 116 and disables and latches the Phase Counter 128.

The count remaining in the Phase Counter 130 is ten times the number of 10 msec intervals between the positive leading edge of the received acoustic signal and the positive leading edge of the following 100 KHz reference square wave.

The data in the Pulse Counter 98 forms the three most significant digits and the Phase Counter 128 contains the four least significant digits of the travel time of the acoustic signal to travel from the Aft projector 61 to the Forward receiver 63 in nanoseconds. This data remains latched in the counters until Flip-flop 1 or circuit 38 is reset at which time the data is transferred to the calculator 138. It is stored in the calculator until it is used during the calculation period.

10 msec after the start of the first period, Flip-flop 1 or circuit 38 goes into the reset condition. The logic zero signal on the output terminal 44 of Flip-flop 1 turns off AND 2 circuit 62 and AND 3 circuit 64. The logic one signal on output terminal 40 of Flip-flop 1 turns on AND 5 circuit 68 and AND 4 circuit 66.

An identical process to that previously described is now used to measure the travel time for the acoustic signal to travel from the Forward projector 65 to the Aft receiver 140. At the end of that period the data in the Pulse Counter 98 and Phase Counter 128 is transferred to the calculator 138 for calculation during the calculation period.

A standard 10 digit calculator microchip is used for the calculation and display of the data. Details of the data entry, calculation, and display are well known in the prior art.

Briefly stated, the time duration for acoustic signals to go from aft projector of module 10 to the receiver of module 12 and the time duration for the acoustic signal from the projector of module 12 to go to the receiver of module 10 is determined electronically by the use of electrical and acoustic pulses simultaneously. This information, together with the distance between points 14 and 16 at the bottom of ship 18, is used to determine the velocity of the ship in the water.

Obviously many modifications and variations of the present invention are possible in the light of the above teachings. As an example, the time travelled by acoustic pulses to go between two preselected points in the direction of motion of the ship and in the opposite direction can be measured in a somewhat different fashion. It is therefore understood that within the scope of the appended claims the invention may be practiced otherwise than as specifically described.

We claim:

1. A ship speed indicator for measuring a ship's speed in a body of water comprising:

a first acoustic projector-receiver module being adapted to be mounted at a first preselected point on the external bottom of the ship, said first acoustic projector-receiver module including a first acoustic transmitter, a first acoustic receiver and a first filtering circuit and a first clipper circuit;

a second acoustic projector-receiver module being adapted to be mounted at a second preselected point on the external bottom of the ship, said second acoustic projector-receiver module including a second acoustic transmitter, a second acoustic receiver and a second filtering circuit and a second clipper circuit, said first and second points being away from the area of turbulence on the external bottom of the ship and the line joining said first and second points being parallel to the line of direction of the ship's motion; and a logic module being mounted inside the ship, said logic module being in communication with said first and second projector-receiver modules.

2. The speed indicator of claim 1 wherein said logic module comprises an oscillator in series connection with six decade registers and a first flip-flop circuit and a second flip-flop circuit for generating electrical signals of different frequencies for initiating various sequential actions in said speed indicator.

3. The speed indicator of claim 2 wherein said logic module further comprises an acoustic flip-flop circuit, a wire flip-flop circuit, and a phase flip-flop circuit adapted to be connected in conjunction with eight AND circuits, two OR circuits, two inverter circuits, three ONE SHOT circuits, two OR circuits, two inverter circuits, three ONE SHOT circuits, a pulse counter, a phase counter, a 10 counter, a calculator circuit, said first and second flip-flop circuits, and said first and second acoustic projector-receiver modules for measuring the time interval for a first acoustic signal to travel from the acoustic transmitter of said first acoustic projector-receiver module to the acoustic receiver of said second acoustic projector-receiver module and for measuring the time interval for a second acoustic signal to travel from the acoustic transmitter of said second acoustic projector-receiver module to the acoustic receiver of said first acoustic projector-receiver module.

\* \* \* \* \*